United States Patent [19]

Murray

[11] 4,172,501
[45] Oct. 30, 1979

[54] SELF PROPELLED CAGE WHEEL TRACTOR

[76] Inventor: Roger L. Murray, 3938 Shimer Rd., Marysville, Calif. 95901

[21] Appl. No.: 802,431

[22] Filed: Jun. 1, 1977

[51] Int. Cl.² ............................................. A01B 29/00
[52] U.S. Cl. .................................... 172/116; 172/121; 172/552; 180/20
[58] Field of Search ............... 172/117, 552, 553, 116, 172/122, 554; 180/52, 49, 14 R, 20, 134; 115/1

[56] References Cited

U.S. PATENT DOCUMENTS

| 127,623 | 6/1872 | Martin | 172/552 |
|---|---|---|---|
| 704,897 | 7/1902 | May | 172/554 |
| 1,800,782 | 4/1931 | Donaldson | 172/554 |
| 1,839,000 | 12/1931 | Quang | 172/121 X |
| 2,560,384 | 7/1951 | Crain | 180/49 |
| 2,870,850 | 1/1959 | Dethlefsen | 172/554 |
| 2,871,956 | 2/1959 | Brent | 172/72 |
| 2,959,201 | 11/1960 | Le Tourneau | 180/20 |
| 3,334,702 | 8/1967 | Granryd | 180/49 |
| 3,675,724 | 7/1972 | Schneider | 180/20 |

FOREIGN PATENT DOCUMENTS 169   9/1953   Philippines .............................. 172/553

Primary Examiner—Richard J. Johnson
Attorney, Agent, or Firm—Blair, Brown & Kreten

[57] ABSTRACT

Disclosed herein is a self propelled drum wheel tractor for use in puddling rice paddies. A pair of drums having a plurality of knife elements disposed thereon serve to bury or puddle the rice stalk, while the field is still flooded.

7 Claims, 6 Drawing Figures

SELF PROPELLED CAGE WHEEL TRACTOR

BACKGROUND OF THE INVENTION

Field of the Invention

This invention relates generally to a machine for burying and turning under the rice straw in a rice paddy.

Once the rice has been harvested from the rice paddy, traditionally the fields have had to be drained and allowed to dry so that the stalks, straw and stubble can be burned. Burning has been considered a necessity because parasitic action will invade the rice straw that has not been burned and destroy future new unharvested rice crops.

Admittedly a certain but very small percentage of rice straw has been harvested for other uses but by comparison the vast majority of rice straw left in the field must be burned off. Ecologically speaking to burn off these rice fields having stubble therein has been undesirable from a smog point of view, and indeed farmers have been restricted as to the days they are allowed to perform the burning.

The essence of this invention therefore, is to provide a machine which avoids the necessity of burning the rice stubble, thereby avoiding the undesirable ecological contamination, and also providing the farmer with more freedom to clear his field when he wants to. This is made possible by the structure to be described hereinafter in which the rice stubble is cut and buried in the mud covered over and left in water, thereby providing an environment hostile to the parasites.

Accordingly it is an object of this invention to provide a means for rice farmers to clear their land for subsequent plantings without the need for burning the stubble in the field.

It is another object of this invention to reduce the pollution attendant with burning rice fields by not burning them at all, plowing them under instead.

Other objects and advantages will become apparent in the following specification when considered in light of the attached drawings.

DESCRIPTION OF THE PREFERRED EMBODIMENT

Figure 1:
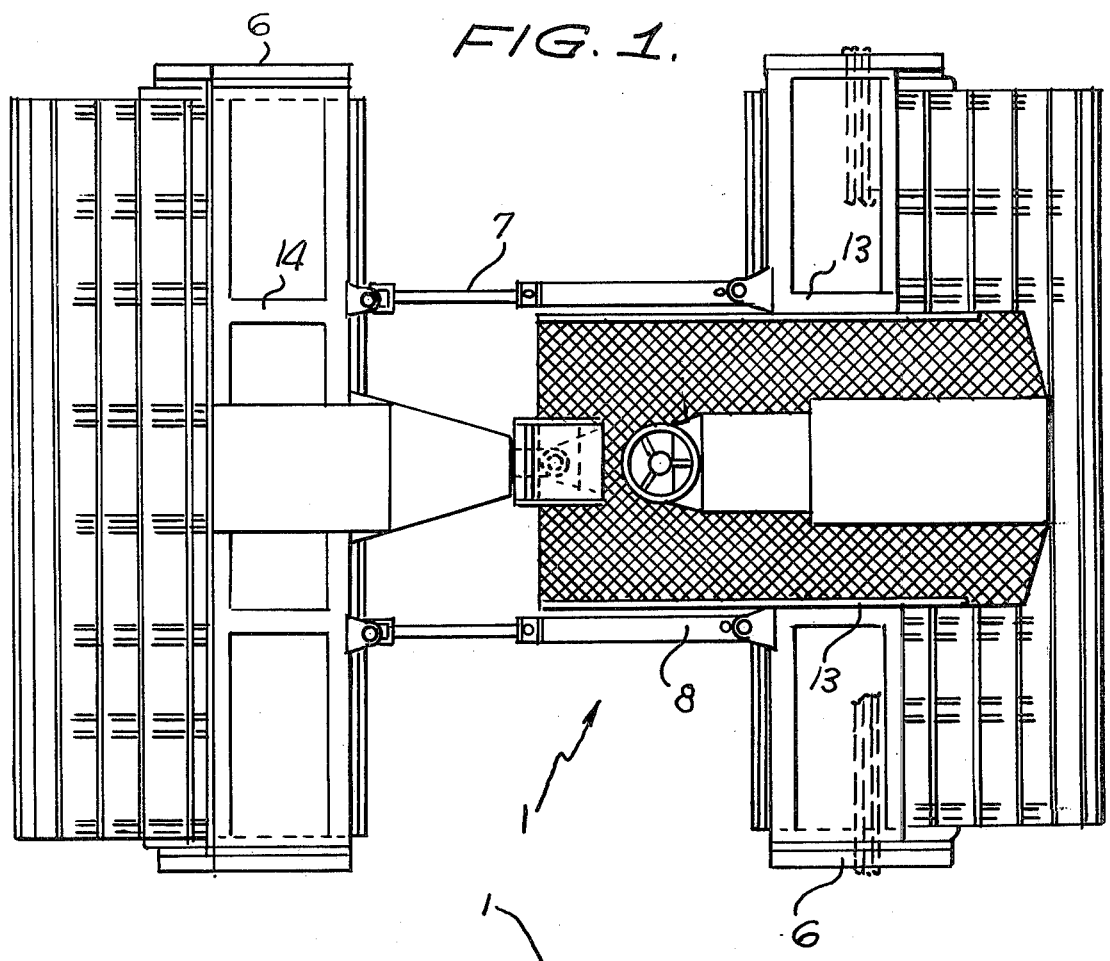
FIG. 1 is a top plan view of the tractor showing the drum wheel assembly.

Referring now to the figures in which like reference numerals indicate like parts throughout, the tractor is generally denoted by numeral 1.

Figure 5:
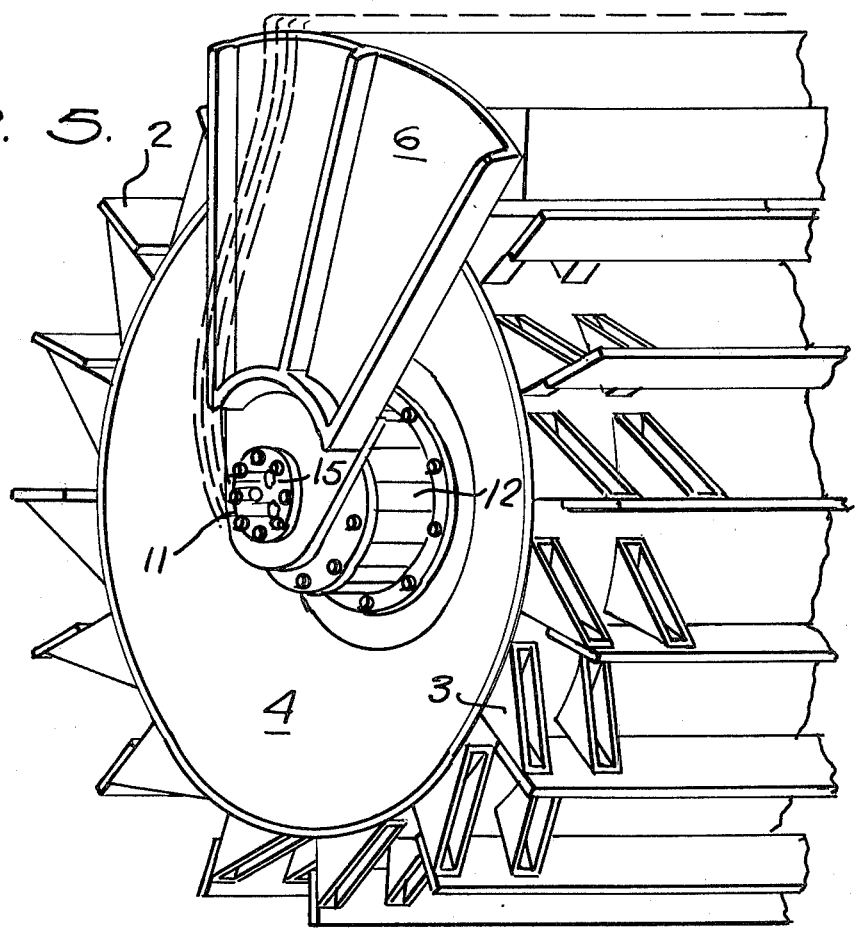
FIG. 5 is a three quarter view of the wheel assembly showing the structural details therein.
Figure 6:
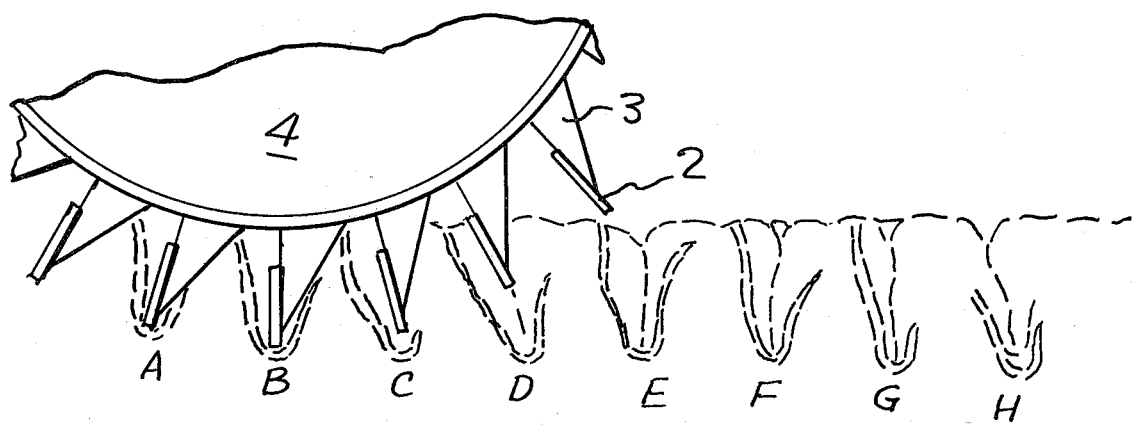
FIG. 6 is a side view of the wheel showing its effect on rice stalks in a rice paddy.

FIGS. 1 through 4 generally show the tractor which has front and rear drum wheels denoted by numeral 4. FIGS. 5 and 6 show the details of these two wheels. On the outer periphery of wheel or drum 4 there are disposed knives 2 which as seen in FIG. 6 are depicted as being straight, they may be curved in either the forward or rearward direction. These knives are preferably six inches long and are supported on the cage drum by a plurality of triangular brace members 3. The cage drum is approximately six feet in diameter.

FIG. 6 shows the stages of compaction for the rice straw as effected by the knife and brace member. At stages A through C it will be observed that the rice stubble has been pushed below the surface of the mud and has been compacted down. Removal of the support brace and knife member is seen in stages D and E. The turbulance caused by the inner action of the drum brace and knife member has caused the opening into which the stubble has been put to start to collapse, and fill back up with mud. Stages F, G and H depict the equilibrium that is reached by having the knife blades cut and coact with the rice stubble and bury it under the ground.

It is important to reemphasize that the rice stubble has to be completely buried as well as inundated, for only if a minor portion of rice stubble is left exposed to the air and is left out standing in the water, it will be susceptible to parasitic attack which will infest and ruin subsequent rice crops. This is why that even today the state of the art for clearing rice fields has been to drain the field let the straw and stubble dry out and then burn it.

Figure 2:
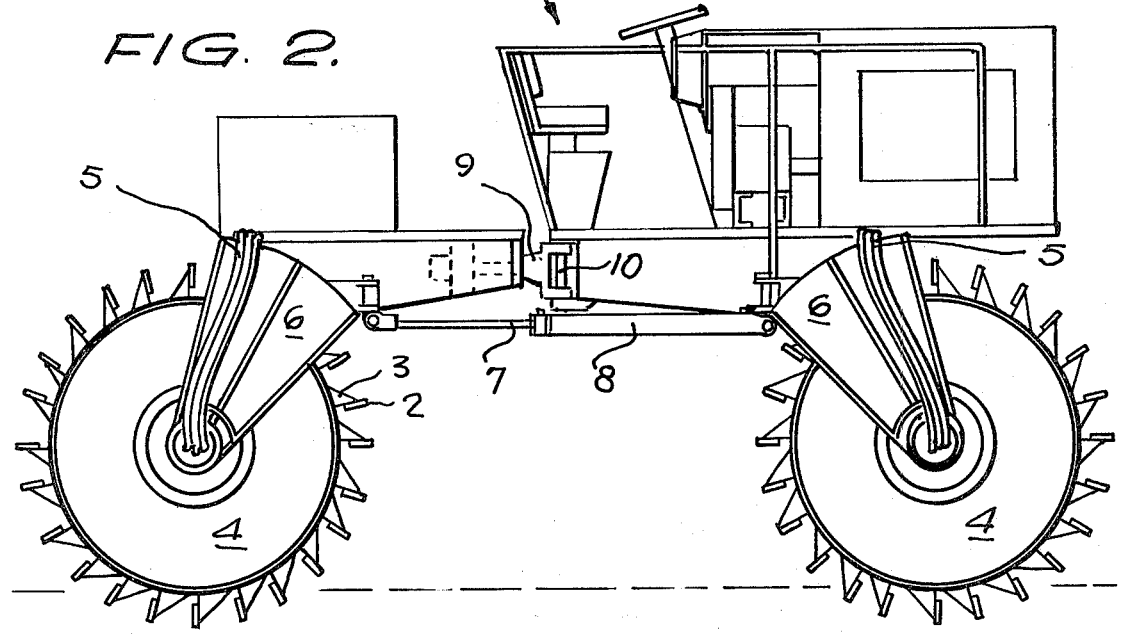
FIG. 2 is a side view thereof.
Figure 3:
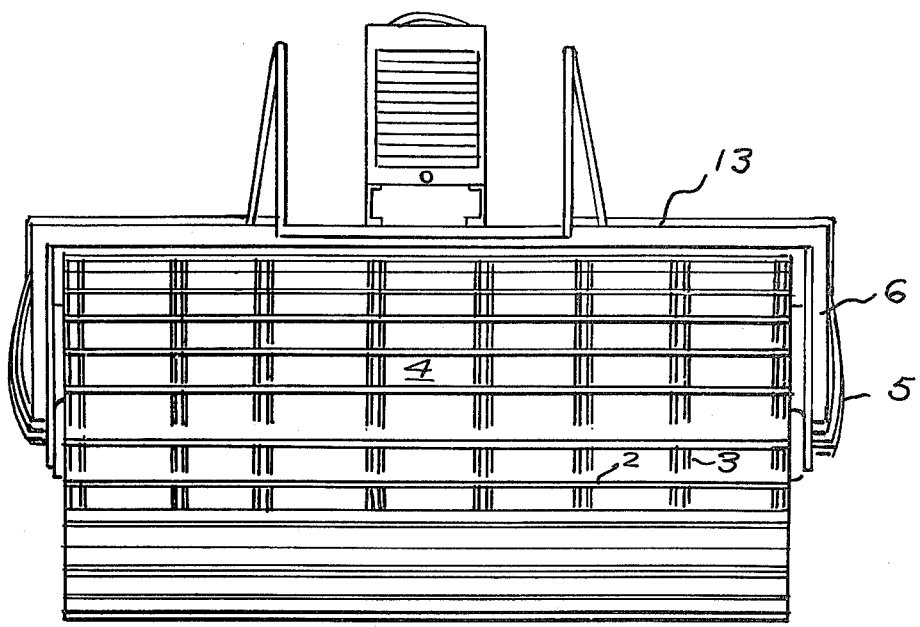
FIG. 3 is a front view of the tractor assembly as seen in FIG. 1.
Figure 4:
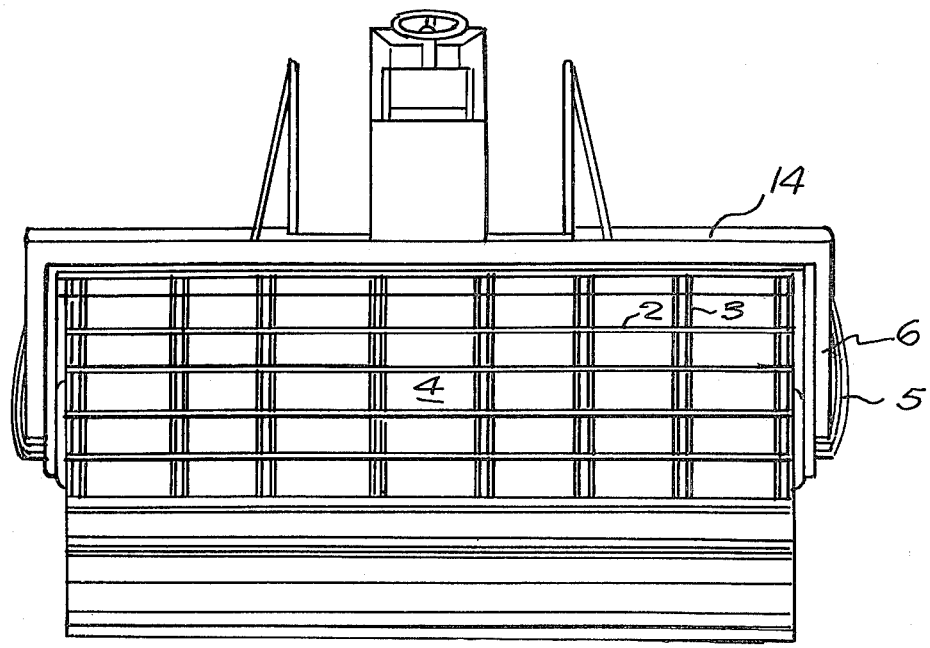
FIG. 4 is an end view of the tractor.

The front and rear drums 4 are supported and carried on an axle 15 which in turn is fastened to arms 6 which are disposed at the extremities of the axle. Arms 6 are connected to each other along the top portion of the tractor by brace members 13 for the front portion and 14 for the rear portion respectively. The orientation of the front and rear drum wheel members is regulated by the damping system denoted by the numerals 7 and 8. These may be a conventional shock absorber type of arrangement, or it may encompass a variable damping system to alter the motion of the front and rear cage wheels depending upon the terrain. The front and rear portions of the tractor are additionally fastened as seen in FIG. 2 at points 9 and 10 by a universal type coupling which permits substantial freedom of motion for the front and rear portions relative to each other, and this is a desirable feature since the tractor must climb over levees built to retain water in the paddies.

The front and rear drum wheels are self propelled by means of a hydrostatic drive which is incorporated within the drums 4 of the front and rear drum wheels. Hydraulic lines 5 communicate with the hydrostatic propulsion system which is generally denoted by numeral 12 best seen in FIG. 5. The hydrostatic actuation mechanism is run off of the diesel motor which sits on top of the tractor.

From the foregoing it will be apparent that the rice paddies can be plowed under and the rice shaft will be assured of being completely buried by virtue of the action of the knives which cuts and buries the straw most beneficially while the water is still in the paddy. This provides additional benefit for farmers who don't have to go to the additional expense of draining their fields. It will also be noted that the contour of the knives may also have a bent or curved portion to accommodate different soil conditions.

Having thus described the preferred embodiment of the invention it should be understood that numerous structural modifications and adaptations may be resorted to without departing from the spirit of the invention.

What is claimed is:

1. A self propelled wheel tractor comprising front and rear hollow water-tight cylindrical drums having a width substantially that of the width of the tractor, said tractor supported on said drums and comprising front and rear sections connected together by coupling means for orienting the sections about a vertical axis and permitting free relative movement of the sections about a longitudinal axis, a plurality of aligned substantially triangular brace members fastened to said drums and emanating outwardly therefrom, a plurality of paddle blades having generally blunt edge portions supported by said triangular brace members so that each blade extends generally radially from said drum and a generally continuous open area exists between said blades and said drums whereby said vehicle may be propelled over flooded grain crop stubble such as rice stalks which are pushed underground and under water by the paddle blades leaving substantially no stubble exposed above the ground and the vehicle is supported by the drums.

2. The device of claim 1 in which means for driving said drums are provided and comprises a hydrostatic drive to allow identical speeds either forward or rearward.

3. The device of claim 2 in which means for connecting said front and said rear drums are provided and comprises an axle for each drum, support arms connected to the extremity of each of said axles, a plurality of cross braces which connect to support arms at the extremities of each of said support arms remote from said axles, damping means disposed between said front and rear drums disposed on said braces, and coupling means disposed between and connecting said drums.

4. The device of claim 3 in which said damping means comprises at least one extensible shock absorber.

5. The device of claim 4 in which said hydrostatic drive is powered by an engine disposed on the cross brace of only one drum, and said engine is balanced and supported by the other drum through said shock absorber and coupling means.

6. The device of claim 5 wherein said coupling means comprises an outer yoke portion from one drum, a pin portion extending between said outer yoke portion, and an inner yoke affixed to said pin within said outer yoke, said inner yoke is attached to the other drum.

7. The device of claim 6 in which said inner yoke is attached to said other drum through a swivel portion whereby said pin and yokes allow rotation about an axis defined by the length of the pin, and the swivel portion allows further rotation about itself so as to provide two degrees of freedom.

* * * * *